US011698942B2

(12) United States Patent
Nagar et al.

(10) Patent No.: US 11,698,942 B2
(45) Date of Patent: Jul. 11, 2023

(54) COMPOSITE DISPLAY OF RELEVANT VIEWS OF APPLICATION DATA

(71) Applicant: International Business Machines Corporation, Armonk, NY (US)

(72) Inventors: Raghuveer Prasad Nagar, Kota (IN); Manjit Singh Sodhi, Bangalore (IN); Raghavendra Krishna Murthy, Bangalore (IN); Manoj Kumar Goyal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 17/026,601

(22) Filed: Sep. 21, 2020

(65) Prior Publication Data

US 2022/0092141 A1  Mar. 24, 2022

(51) Int. Cl.
*G06F 16/90* (2019.01)
*G06F 16/9538* (2019.01)
*G06F 9/451* (2018.01)
*G06F 16/9535* (2019.01)
*G06F 3/14* (2006.01)
*G06F 9/54* (2006.01)
*H04L 67/50* (2022.01)

(52) U.S. Cl.
CPC ........ *G06F 16/9538* (2019.01); *G06F 3/1454* (2013.01); *G06F 9/452* (2018.02); *G06F 9/543* (2013.01); *G06F 16/9535* (2019.01); *H04L 67/535* (2022.05)

(58) Field of Classification Search
None
See application file for complete search history.

(56) References Cited

U.S. PATENT DOCUMENTS

| 8,589,423 | B2 | 11/2013 | Kern | |
|---|---|---|---|---|
| 9,004,997 | B1 | 4/2015 | Prosin | |
| 9,764,226 | B2 | 9/2017 | Prosin | |
| 9,983,666 | B2 | 5/2018 | Lankford | |
| 10,484,505 | B2 | 11/2019 | Kridlo | |
| 2009/0037355 | A1* | 2/2009 | Brave | G06F 16/9535 706/45 |
| 2013/0318083 | A1* | 11/2013 | Han | G06F 16/284 707/736 |

(Continued)

FOREIGN PATENT DOCUMENTS

| CN | 104360816 B | 1/2018 |
|---|---|---|
| WO | 2010020914 A1 | 2/2010 |
| WO | 2010030914 A2 | 3/2010 |

OTHER PUBLICATIONS

"Use Snipping Tool to capture screenshots", Windows Help, printed on Jun. 18, 2020, 3 pages, <ttps://support.microsoft.com/en-in/help/13776/windows-10-use-snipping-tool-to-capture-screenshots>.

(Continued)

*Primary Examiner* — Belix M Ortiz Ditren
(74) *Attorney, Agent, or Firm* — David B. Woycechowsky

(57) ABSTRACT

Generating a composite screenshot including contextually relevant screenshots and displayed information. The composite screenshot includes one or more screenshots captured from a display screen of a requesting user. Contextual relevance is determined according to collected user communications data such as IoT interactions, social media posts, and chat session transcripts.

3 Claims, 4 Drawing Sheets

(56) References Cited

U.S. PATENT DOCUMENTS

| | | | |
|---|---|---|---|
| 2014/0218385 A1* | 8/2014 | Carmi | G06V 10/25 345/620 |
| 2015/0220814 A1* | 8/2015 | Verkasalo | G06Q 20/3255 382/103 |
| 2017/0052983 A1* | 2/2017 | Pearlman | G06F 16/9566 |
| 2019/0114131 A1 | 4/2019 | Wygonik | |
| 2019/0171667 A1 | 6/2019 | Gadepalli | |

OTHER PUBLICATIONS

Bacchus, Arif, "Newest Microsoft Garage project brings AI to the Snipping Tool", May 10, 2018, OnMSFT.com, 3 pages, https://www.onmsft.com/news/newest-microsoft-garage-project-brings-ai-to-the-snipping-tool>.

Disclosed Anonymously et al, "A Method of Obtaining Effective Screenshots Automatically", An IP.com Prior Art Database Technical Disclosure, IP.com No. IPCOM000260791D, IP.com Electronic Publication Date: Dec. 21, 2019, 6 pages.

Garage Team et al., "Snip Insights brings AI to Snipping tool with intelligent insights", May 9, 2018, 5 pages, <https://www.microsoft.com/en-us/garage/blog/2018/05/snip-insights-brings-ai-to-snipping-tool-with-intelligent-insights>.

* cited by examiner

COMPOSITE DISPLAY OF RELEVANT VIEWS OF APPLICATION DATA

BACKGROUND

The present invention relates generally to the field of data processing, and more particularly to capturing relevant display views from applications.

In general, cloud computing, and cloud storage, can be described as the on-demand availability of computer system resources including data storage without direct active management of the resources by the end user. The term is used to describe data centers being available to many users and entities via the internet. Cloud computing environments generally rely on the sharing of resources to achieve coherence and economies of scale.

Cloud data storage is often used by individual users and may require vast amounts of storage space. Storing captured screenshots in cloud data storage is one example of a common user activity that demands storage space.

SUMMARY

According to an aspect of the present invention, there is a method, computer program product and/or system that performs the following operations (not necessarily in the following order): (i) collecting context data associated with a requesting user; (ii) identifying within a display screen an application window having contextually relevant information; (iii) capturing a first screenshot of the contextually relevant information in the application window; (iv) identifying within the display screen a secondary window having additional relevant information; (v) appending the first screenshot with the additional relevant information to generate a complete screenshot; and (vi) presenting the complete screenshot to the requesting user.

DETAILED DESCRIPTION

Figure 1:
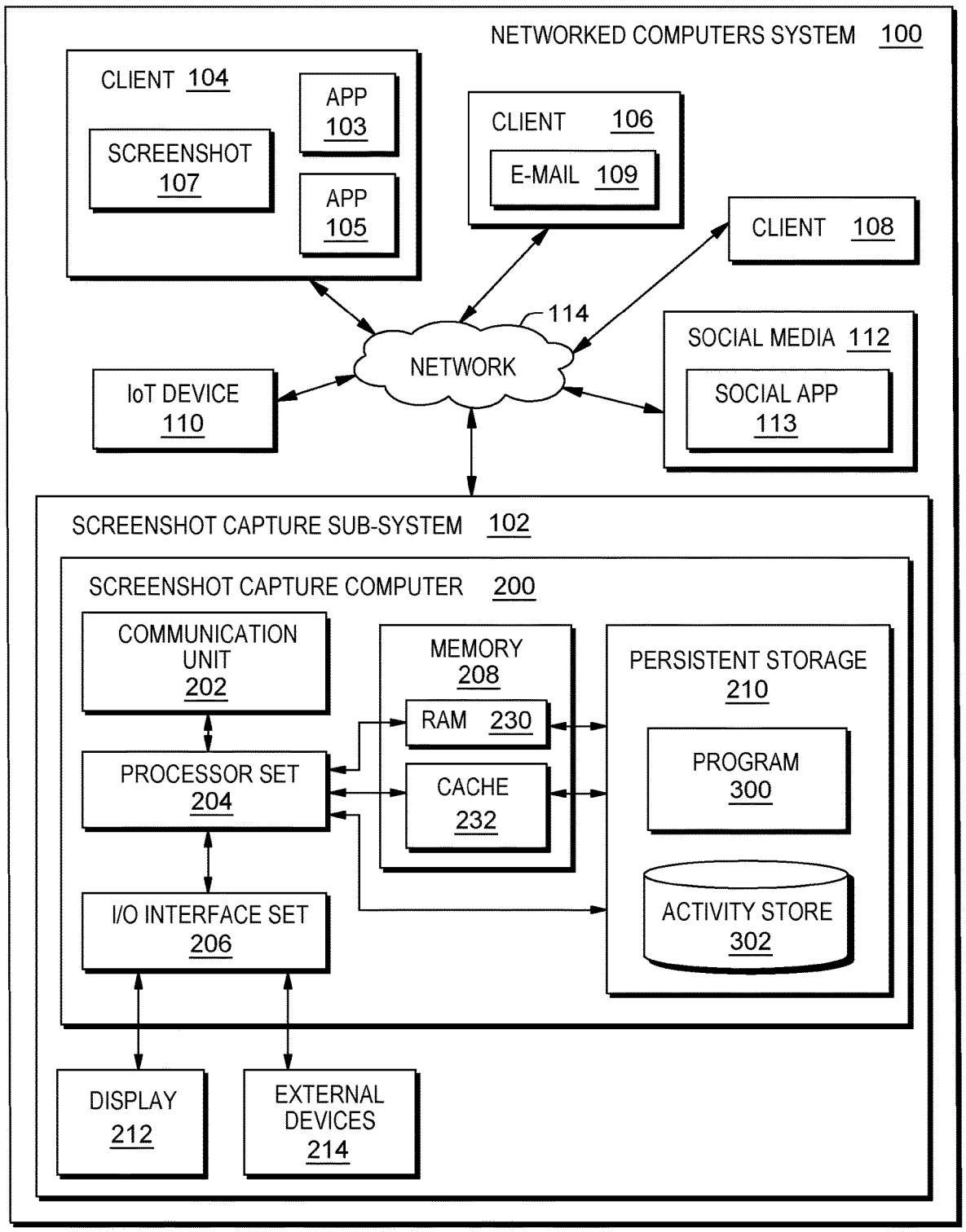
FIG. 1 is a block diagram view of a first embodiment of a system according to the present invention.

Some embodiments of the present invention are directed to generating a composite screenshot including contextually relevant screenshots and displayed information. The composite screenshot includes one or more screenshots captured from a display screen of a requesting user. Contextual relevance is determined according to collected user communications data such as IoT interactions, social media posts, and chat session transcripts.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: screenshot capture subsystem 102 (sometimes herein referred to, more simply, as subsystem 102); client subsystems 104, 106, and 108; screenshot application 107; applications 103, 105; e-mail application 109; Internet of Things (IoT) device sub-system 110; social media sub-system 112; social media application 113; and communication network 114. Screenshot capture subsystem 102 includes: screenshot capture computer 200; communication unit 202; processor set 204; input/output (I/O) interface set 206; memory 208; persistent storage 210; display 212; external device(s) 214; random access memory (RAM) 230; cache 232; screenshot capture program 300 (sometimes herein referred to, more simply, as program 300); and user activity store 302.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with screenshot capture computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Some embodiments of the present invention are directed to capturing a relevant screenshot of an active application displayed on a screen of a computing device (for example, a smartphone, tablet, laptop, or computer display). Additionally, relevant screenshots of other open applications may be captured in response to a request to capture a user's screen.

Figure 2:
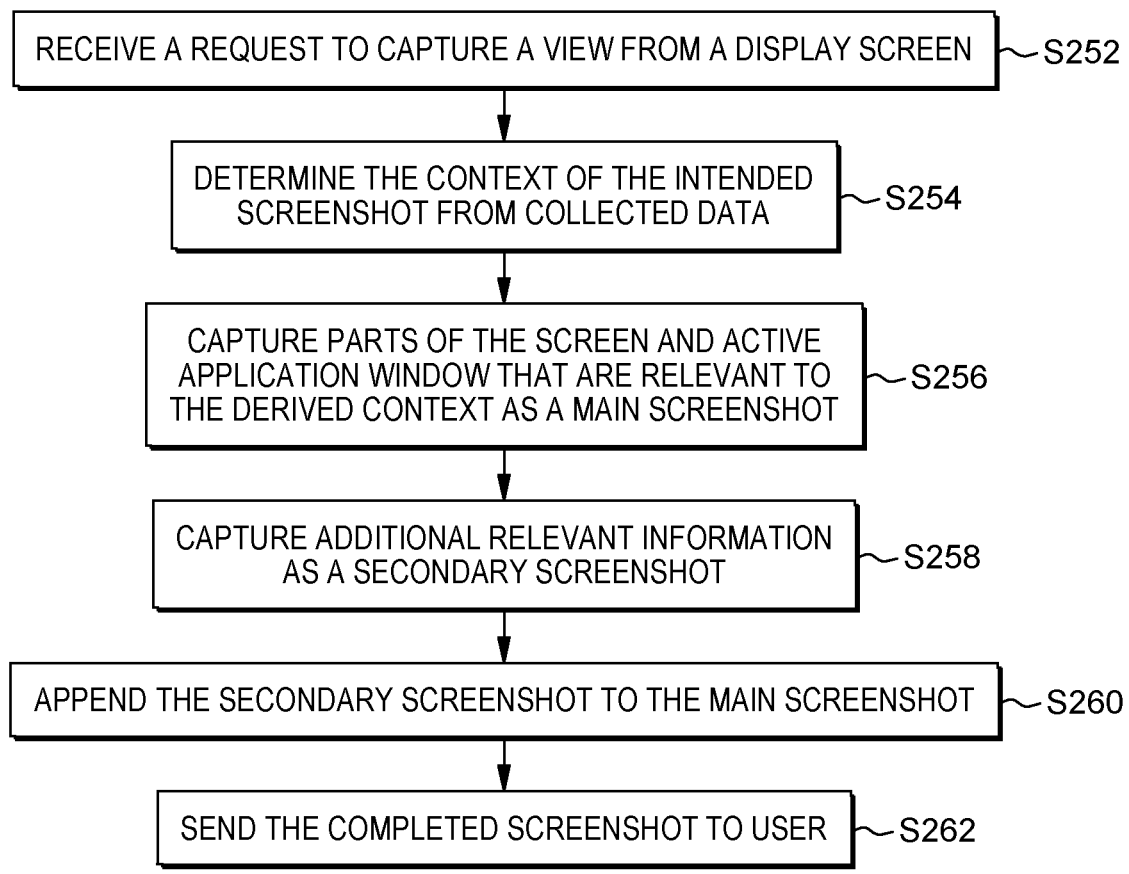
FIG. 2 is a flowchart showing a first embodiment method performed, at least in part, by the first embodiment system.
Figure 3:
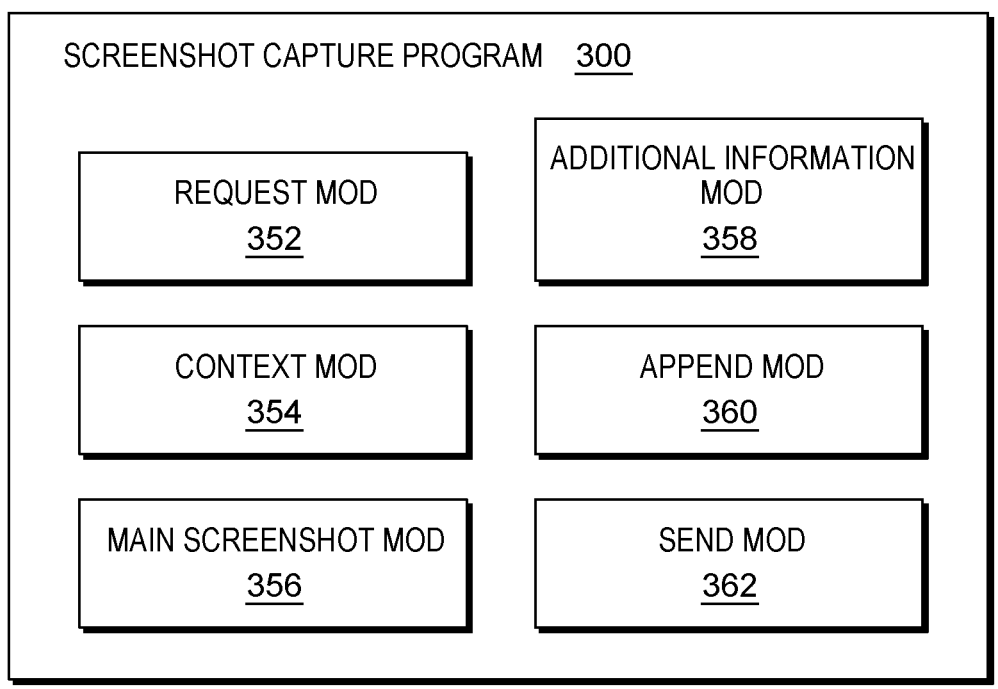
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S252, where request module ("mod") 352 receives a request to capture an image or screen view from a display screen. In this example, mod 352 client subsystem 104 displays views of applications 103 and 105 on a display screen. The request to captures the displayed views is initiated by a user operating client subsystem 104. A request may be made in several way known in the art including clicking the print-screen button on a keyboard or via a user interface provided by an application such as screenshot application 107. In some embodiments of the present invention, the request to capture a screen view includes an email address to send the requested screenshot. In this example, input for this operation is provided through client 104 using network 114 into screenshot capture computer 200 within screenshot capture subsystem 102.

Processing proceeds to operation S254, where context mod 354 determines the context of the intended screenshot from collected data. The context in which the capture is requested is determined at least in part according to collected context data. Context mod collects context data in order to determine the context of the requested screenshot. Context data includes: (i) recent user activities (for example, the user is writing an email, or is involved in a chat session, which requires a screenshot); (ii) IoT data; (iii) communications data including chat session transcripts; (iv) social media data; and (v) recent activity on a particular device or sub-system. The context data is analyzed for contextual clues such as patterns associated with requests for screenshots and subject matter of interest that can be identified in the display screen of the requesting computer system. In this example, context data is collected by program 300 over network 114 and stored in activity store 302. Context data is collected, for example, from app 103, app 105, IoT device 110, social app 113.

Alternatively, context is derived based on recent activity of the requesting user or client sub-system 104 via web analytics techniques, where previous actions are viewed as a series of repeated steps. For example, application 103 is closed at 5 pm each day by client 104 and a screenshot of the displayed view of the application is captured. In this example, web analytics techniques discover the pattern and cause a screenshot of the application 103 display when a screenshot request is made at 5 pm whether the application 103 display is active or not because of the known context in which the screenshot request is being made Processing proceeds to operation S256, where main screenshot mod 356 captures parts of the display screen and active application window that are relevant to the derived context as a main screenshot. The capture screenshot mod only captures the portions of the display screen and active application window that are aligned with the context of the intended screenshot. In this example, the capture screenshot mod recognizes Application 103 as the active window on the display screen of client sub-system 104 (FIG. 1). There is also a window open showing a view from Application 105. Following process steps of receiving the screenshot request and determining context in which the screenshot is requested, the screenshot module captures all data in a sub-window displayed in the Application 103 window. For example, the context is determined to be capturing a chat session where a technical problem for a printer device is discussed. Even though the visible display screen only shows a latest portion of the chat session, the example embodiment captures all chat data available through a predetermined date and time when the technical problem arose. Alternatively, the screenshot mod captures data in the sub-window to the extent that the screenshot will fit onto a specified sheet size of paper. Alternatively, only the visible chat session is captured as a screenshot. Alternatively, the context being a chat session, the application running the chat session, whether active or not, is the application for which the screenshot is taken.

Processing proceeds to operation S258, where additional information mod 358 captures additional relevant information as a secondary screenshot. Information mod 358 captures information from sources other than what is captured in the main screenshot from locations in opened files, browser pages, and/or information accessible via the corresponding sub-system. Continuing with the example above, where the main screenshot includes a chat session that is determined to be contextually relevant to the request for image capture, the printer for which the chat session is about may also be determined to be relevant. When a display screen from a web browser available on client sub-system 104 displays products specifications for the printer, capture additional information mod 358 captures the product specifications as a secondary screenshot. More than one secondary screenshot may be captured by capture additional information mod 358 where multiple additional sources are available and relevant to the main screenshot.

Processing proceeds to operation S260, where append mod 360 appends the secondary screenshot to the main screenshot. In this example, the product information captured in the secondary screenshot is combined with the main screenshot of the chat session. The combined image is adjusted for display to the user. In various embodiments: (i) the user pre-defines the desired display format for the screenshot; (ii) the screen capture program operates on a default setting to combine the relevant screenshot portions onto a single sheet size for printing; and/or (iii) the combined screenshot is created such that it is scalable or otherwise editable by a user. In some embodiments, appending the secondary screenshot to the main screenshot is performed according to a predefined layout such that the main screenshot is displayed at the top of the image display and the secondary screenshot is displayed below the main screenshot in the image display. Alternatively, the secondary screenshot is superimposed onto the main screenshot according to relative scaling criteria. Alternatively, the append mod appends the additional relevant information in the secondary screenshot to a location within the bounds of the main screenshot. The appending operation performed by append mod 360 may apply to more than one additional screenshot or information in screenshots where more than one additional screenshot is captured as secondary screenshots.

Processing concludes at operation S262, where send mod 362 sends the completed screenshot to the user. In this example, the combined screenshot displaying the main screenshot and the secondary screenshot is presented to the requesting user. Alternatively, the completed screenshot is emailed to a pre-defined sub-system such as to E-mail Application 109 of Client Sub-system 109 (FIG. 1). In addition, the send mod determines the users screenshot capture preferences by user input or by analyzing previous actions related to capturing screenshots, such as not capturing browser menus.

III. Further Comments and/or Embodiments

Some embodiments of the present invention recognize the following facts, potential problems and/or potential areas for improvement with respect to current screenshot methods: (i) irrelevant information is captured along with relevant information; (ii) exhibits an increase in the size of the file due to irrelevant information; (iii) exhibits an increase in network throughput (if the file is being transferred across the network) due to increased size; (iv) exhibits an increase in overall cost due to these above factors; and (v) auto zoom-out capabilities do not exist.

Some embodiments of the present invention recognize the following facts, potential problems and/or potential areas for improvement with respect to a screenshot sample problem: (i) user "A" has submitted an online application; (ii) the system displays confirmation details to user "A"; (iii) along with the confirmation details, other non-transactional information, like advertisements and organization log, is also displayed to the user; (iv) the confirmation details are too big to be displayed on current screen, so the system displays a vertical scroll bar; (v) user "A" wants to take screenshot of the confirmation; (vi) as of today: (a) user has to take multiple screenshots (one before using the vertical scroll bar, and the remaining based on the size of the contents below), and (b) user has to crop the screenshot (either using a cropping feature enabled screen capture software or resaving screenshot after removing the unwanted/non-transactional information); and (vii) what is needed is a way to make the system intelligent enough to understand user's need and take the intended screenshot, so that user doesn't have the inconveniences highlighted above.

Some embodiments of the present invention may include one, or more, of the following operations, features, characteristics and/or advantages: (i) a machine learning and IoT (Internet of things) based system and method to predict information within the application (to which current screen belongs) which a user wants to capture as a screenshot; (ii) captures the screenshot with required information, on the first command (to capture the screenshot) from the user; and (iii) the method includes the following operations: (a) derives the context of the intended screenshot, based on user's recent activities on the device, activity history, IoT Data, communications and social media, (b) detects parts of the screen and active applications that are relevant to derived context, (c) captures only that relevant part of the screen/active-application in a screenshot, (d) based on the derived context, if required, captures the information from other sources (for example, opened files, browser pages, or any other accessible information including public information) and appends them into the main screenshot, and (e) identifies if the screen being captured is too long, then perform an auto zoom-out to capture the required information into a single image.

Some embodiments of the present invention recognize the following facts, potential problems and/or potential areas for improvement with respect to a solution to the screenshot sample problem, and user "A" described above: (i) user "A" issues a command to take a screenshot using the "print screen" button on the keyboard; (ii) the system detects that this application, for example, is an online business visa application; (iii) the system has learnt that: (a) user "A" always removes the browser part (like browser menu) and advertisements, and (b) user "A", and 80% of other users, have taken multiple screenshots to capture information to the bottom of the page; (iv) the system detects that the current confirmation page has some not-displayed information, which can be displayed only using the computer vertical scroll bar; (v) the system zooms out the browser to capture the entire confirmation information in a single screenshot; (vi) the system refines and saves the screenshot, for example, only saving the visa application confirmation information; and (vii) user "A" is happy because user "A": (a) gets all required information captured with a single command; (b) does not need to take multiple screenshots; and (c) does not need to crop the taken screenshot(s).

An example use case follows. When a support resource completes a period of support, a hand-over email is sent to a subsequent support resource taking over the support process in another geographical location. The hand-over email should include information on current customer relationships and current operations data. This data may be available by screenshot on two different applications, such as Salesforce and Pagerduty. (Note: the term(s) "SALESFORCE" and/or "PAGERDUTY" may be subject to trademark rights in various jurisdictions throughout the world and are used here only in reference to the products or services properly denominated by the marks to the extent that such trademark rights may exist.)

According to some embodiments of the present invention, the support resource would keep all cases reported in the customer relationships application. Accordingly, upon discovering the context of a support resource closing out the period of support, the right and relevant part of the customer relationships screenshot is captured. Having determined the context, the operations application screenshot is also captured as relevant information from other sources. The operations screenshot is appended to the customer relationships screenshot to create an in-flight screenshot for transmission as part of the hand-over email.

Figure 4:
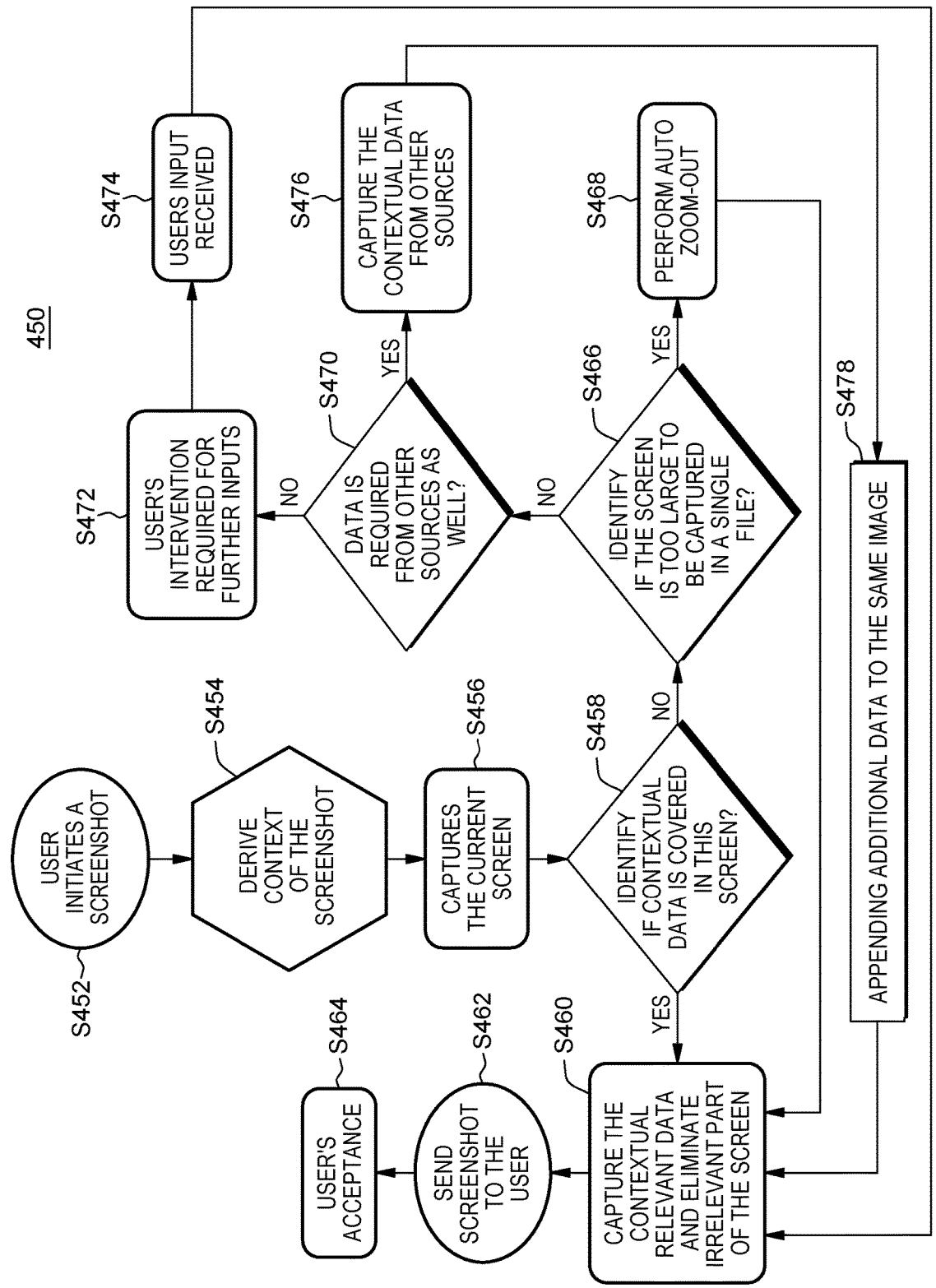
FIG. 4 is a system diagram showing a second embodiment method according to the present invention.

As shown in FIG. 4, operations described in flowchart 450 are performed at least in part on computer software running on computer hardware. An example environment in which these operations may be performed is networked computers system 100 (FIG. 1).

Processing begins at operation S452, where capturing the part of the computer/display screen that is relevant to the user is performed. In this example, the user issues a command to take a screenshot using the "print screen" button on his/her keyboard. In addition, this capture operation only captures the part of the screen which is based on the user's context. For example, this capture operation is based on but is not limited to the user's recent activity on the device being used, activity history, IoT (internet of things) data, communications, and social media.

Processing proceeds to operation S454 where the screenshot application derives the context of the initiated screenshot with reference to stored user conversations including email communications, chat session transcripts, and/or social media postings. In this example, the user "opts-in" for the service of obtaining screenshots for his/her use. In addition, operation S454 detects parts of the screen and the active application that are relevant to the derived context.

Processing proceeds to operation S456, where capturing the current screen selected by the user is performed. For example, operation S456 detects that the current confirmation page has some not-displayed information, which can be displayed only using the vertical scroll bar on the users' keyboard. In addition, the system captures additional information, such as images, from other sources (for example, an external website/page) and appends the additional information with the relevant screenshot to generate a clubbed image screenshot. Also, the system: (i) prepares context for capturing screenshots irrespective of how the user is performing his or her duties; (ii) prepares context for capturing screenshots irrespective of display arrangement; and (iii) prepares context for capturing screenshots and uses the same while capturing screenshots.

Processing proceeds to operation S458, where determining if the contextual data is covered in the screen being observed by the user is performed. If "YES", processing continues to operation S460 described below. If "NO", processing continues to operation S466 described below.

Processing proceeds to operation S460, where capturing the contextual relevant data and eliminating the irrelevant part of the screen capture is performed. In this example, operation S460 captures only the part of the screen/active application being currently used and that is relevant to the user. The system automatically refines and saves the screenshot information. Alternatively, operation S460: (i) gets all required information captured with a single command; (ii) does not need to take multiple screenshots; (iii) does not need to crop the taken screenshot(s); and (iv) detects the purpose of the screenshot, for example, an online application for a business visa. As a further example, screenshot context is derived based on: (i) recent user activities using web analytics techniques (for example, user is writing an email which requires a screenshot); (ii) IoT data; (iii) communications (for example, a manager has asked the employee to share a training completion confirmation screenshot); (iv) social media (for example, user has posted a query on a social networking site asking if there are Italian restaurants in a certain city), and (v) activity history (for example, user most of the times removes advertisements from the screenshot).

Processing proceeds to operation S462, where sending the captured screenshot to the user is performed. In this example, the screenshot that is captured can be, but is not limited to, a screenshot of the users' smartphone, laptop, or computer display. Also, the system prepares context for capturing screenshots irrespective of the users display arrangements.

Processing proceeds to operation S464, where accepting and storing the user's screenshot is performed. In addition, a "learning" operation is performed that sends the user accepted screenshot data/information back to operation S454 for further processing. As an example, in this "learning" operation, the system learns that: (i) the user always removes browser sections (like the browser menu) and advertisements; and (ii) the current user, and 80% of other users, have taken multiple screenshots to capture information to the bottom of the page displayed on the screen.

Additionally, as an example, supervised machine learning is applied across the users to decide, where: (i) features include application domain, application, time, etc.; and (ii) labels have complete information, advertisement, and branding. Natural language processing techniques, specifically syntax and semantics techniques, are used to derive the context of the information available in natural language.

Processing proceeds to operation S466, where determining/identifying if the screen is too large to be captured in a single file is performed. If "YES", processing continues to operation S468 described below. If "NO", processing continues to operation S470 described below.

Processing proceeds to operation S468, where the operation of automatically zooming out the screenshot is performed. In this example, operation S468 identifies if the screen being captured is too long/large, then performs an auto zoom-out to capture the required information into a single image. In addition, processing information from the auto zoom-out operation of S468 is sent to operation S460 as input for further processing.

Processing proceeds to operation S470, where analyzing and determining if data is required from other sources, other than the screenshot data, is performed. If "YES", processing continues to operation S476 which will be described below. If NO", processing continues to operation S472 which will be described below.

Processing proceeds to operation S472, where processing any/all user interventions, that are required, as further inputs to the process is performed.

Processing proceeds to operation S474, where receiving input from the user for processing is performed. In addition, this input is then sent to operation S460 as input for further processing.

Processing continues to operation S476, where capturing contextual data from other sources is performed. In this example and based on the derived context, operation S476 captures information from other sources (for example, opened files, browser pages, or any other accessible information including public information).

Processing concludes at operation S478, where information obtained from operation S476 above is appended into the main screenshot. In addition, operation S478 sends this information to operation S460 for further processing.

Some embodiments of the present invention may include one, or more, of the following operations, features, characteristics and/or advantages: (i) captures the only part of the screen which is relevant to the user; (ii) captures the only part of the screen which is based on user's context; (iii) captures relevant information from other sources and append it into the screenshot being generated; and (iv) performs auto zoom-out while capturing big screen.

Some embodiments of the present invention may include one, or more, of the following operations, features, characteristics and/or advantages: (i) automatically identifies the screen to be captured; (ii) reduces the file size by capturing only the relevant information; (iii) reduces the network latency with small size files; (iii) reduces manual efforts by automatically adding required data from other sources; (iv) reduces manual efforts when capturing a long screen by automatically performing zoom-out; (v) is in-line with present focus on AI (artificial intelligence); and (vi) is a cognitive system.

Some embodiments of the present invention may include one, or more, of the following operations, features, characteristics and/or advantages: (i) user "opts-in" for the service; (ii) screenshot context is derived based on: (a) recent user activities using web analytics techniques (for example, user is writing an email which requires a screenshot), (b) IoT data (for example: user has recently asked Alexa "Is passport number required while applying for Aadhar?"), (c) communications (for example, manager has asked the employee to share training completion confirmation screenshot), (d) social media (for example, user has posted a query on a social networking site asking if there are Italian restaurants in certain city), and (e) activity history (for example, user most of the times removes advertisements from the screenshot); (iii) supervised machine learning is applied across the users to make a decision, where: (a) features include application domain, application, and time, and (b) labels have complete information, advertisement and branding; (iv) natural language processing techniques, specifically syntax and semantics techniques, are used to derive the context out of the information available in natural language; and (v) capturing the relevant part of the screen can be accomplished using existing commercially available applications.

Some embodiments of the present invention may include one, or more, of the following operations, features, characteristics and/or advantages: (i) captures relevant screenshots of a screen/device (for example, smartphone, tablet, laptop, or computer display) based on context of a user derived from various factors such as, recent activities of the user on the device, historical data, IoT data, communication data, social media data and the like; (ii) captures only the part of the screen which is relevant to the user; (iii) captures additional information, such as an image, from other sources (for example, an external website page) and appends the additional information with the relevant screenshot to generate a clubbed image (screenshot); and (iv) performs auto zoom-out/zoom-in to adjust the size of the screenshot while capturing the screenshot.

Some embodiments of the present invention may include one, or more, of the following operations, features, characteristics and/or advantages: (i) is an AI and IoT based system and method for capturing screenshots based on the context in such a way that the irrelevant part of the current screen is not included in the final screenshot; (ii) relevant information not included in current screen is synthesized and added to the final screenshot, without the user explicitly indicating what is relevant; (iii) captures the relevant part of the current screen by deriving relevance, and hence non-relevance, based on the user's recent activities on the device, activity history, IoT data, communications and social media; (iv) captures screenshots based on context; and (v) prepares context for capturing screenshots irrespective of display arrangement.

Some embodiments of the present invention may include one, or more, of the following operations, features, characteristics and/or advantages: (i) synthesizes additional information required within the intended screenshot from external sources (other than current screen) and appends the synthesized information to the final screenshot to generate a clubbed screenshot which will be relevant to the user; (ii) has nothing to do with multiple-display devices; (iii) synthesizes, not appends, additional information (which will make the intended screenshot relevant to the user) to be part of the final screenshot; (iv) captures additional information, such as an image, from other sources (for example, from an external website/page) and appends the additional information with the relevant screenshot to generate a clubbed image (screenshot); (v) performs auto zoom-out/zoom-in to accommodate the derived relevant contents on the final screenshot; and (vii) includes zoom-in/zoom-out operation/activity offering better user experience of the final screenshot(s).

Some embodiments of the present invention may include one, or more, of the following operations, features, characteristics and/or advantages: (i) has nothing to do with remotely monitoring or recording agent/user activities through screenshots; (ii) prepares context for capturing screenshots irrespective of how the user is performing user's duties; (iii) has nothing to do with remotely capturing user (call center agent) actions while interacting with the customers; (iv) synthesizes, not appends, additional information (which will make the intended screenshot relevant to the user) to be part of the final screenshot; (v) has nothing to do with remotely monitoring or recording agent/user activities through screenshots; and (vi) prepares context for capturing screenshots and uses the same while capturing screenshots.

Some embodiments of the present invention may include one, or more, of the following operations, features, characteristics and/or advantages: (i) has nothing to do with messaging/chat; (ii) has nothing to do with globalization and changes in language literals; and (iii) focuses on a better user experience of the screenshots, based on the dynamically synthesized relevant information, which should be part of the final screenshot.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving first user input indicating that a requesting user wants to capture a screen shot of a first active window;
responsive to the receipt of the first user input, collecting context data associated with the requesting user;
storing an original version of a screenshot of a visible portion of the first active window;
identifying a first piece of contextually relevant information that is included in the active window, but not in the visible portion of the first active window and therefore not included in the original version of the screenshot;
creating an enhanced version of the screenshot corresponding to an image that includes the visible portion of the first active window and the first piece of contextually relevant information; and
storing the enhanced version of the enhanced version of the screenshot.

2. A computer-implemented method comprising:
receiving first user input indicating that a requesting user wants to capture a screen shot of a first active window;
responsive to the receipt of the first user input, collecting context data associated with the requesting user;
storing an original version of a screenshot of a visible portion of the first active window;
identifying a first piece of contextually irrelevant information that is included and visible in the active window, but not likely to be relevant to the first user;
creating an enhanced version of the screenshot corresponding to an image that includes the visible portion of the first active window and the first piece of contextually relevant information; and
storing the reduced version of the enhanced version of the screenshot.

3. A computer-implemented method comprising:
receiving first user input indicating that a requesting user wants to capture a screen shot of a first active window;
responsive to the receipt of the first user input, collecting context data associated with the requesting user;
storing an original version of a screenshot of a visible portion of the first active window;
identifying a first piece of contextually relevant information that is included in the active window, but not in the visible portion of the first active window and therefore not included in the original version of the screenshot;
identifying a first piece of contextually irrelevant information that is included and visible in the active window, but not likely to be relevant to the first user;
creating an enhanced version of the screenshot corresponding to an image that includes the visible portion of the first active window and the first piece of contextually relevant information; and
storing the enhanced/reduced version of the enhanced version of the screenshot.

* * * * *